(No Model.)
F. A. WILMOT.
HUB FOR WHEELS.
No. 469,494.  Patented Feb. 23, 1892.
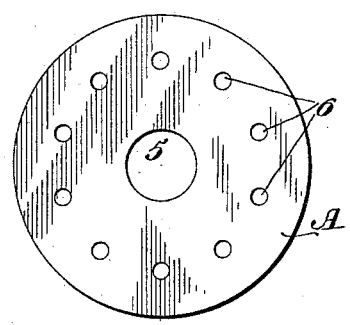
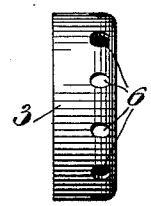
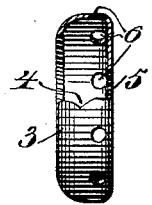
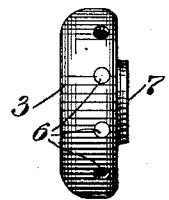
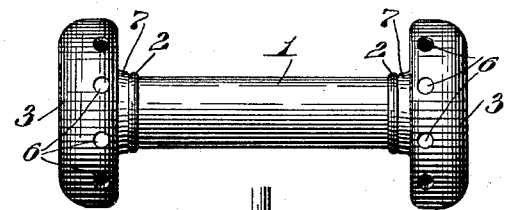
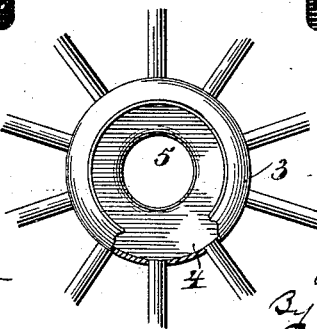
WITNESSES  INVENTOR
Frank A. Wilmot

UNITED STATES PATENT OFFICE.

FRANK A. WILMOT, OF BRIDGEPORT, CONNECTICUT, ASSIGNOR TO THE WILMOT & HOBBS MANUFACTURING COMPANY, OF SAME PLACE.

HUB FOR WHEELS.

SPECIFICATION forming part of Letters Patent No. 469,494, dated February 23, 1892.

Application filed September 15, 1891. Serial No. 405,752. (No model.)

*To all whom it may concern:*

Be it known that I, FRANK A. WILMOT, a citizen of the United States, residing at Bridgeport, in the county of Fairfield and State of Connecticut, have invented certain new and useful Improvements in Hubs for Wheels and Method of Making the Same; and I do hereby declare the following to be a full, clear, and exact description of the invention, such as will enable others skilled in the art to which it appertains to make and use the same.

My invention relates to hubs for wire wheels, more especially wheels for children's carriages, and the method of making the same, and has for its object to generally improve the construction of the hubs and provide a receptacle for oil that may escape from the box and to prevent it from running down on the spokes and soiling clothing that may come in contact with it, and also to devise a simple and inexpensive method of making the hubs, whereby the cost of production shall be greatly reduced. In order to accomplish these results, I have devised the novel hub and method of making the same, which I will now describe, referring by numbers and letters to the accompanying drawings, forming part of this specification, in which—

Figure 1 is a view of the disk from which each flange is formed; Fig. 2, a view of the partially-formed flange after the first cupping or drawing operation has been performed; Fig. 3, a view of the disk after the third operation has been performed; Fig. 4, a similar view showing the flange as provided with a neck to give greater bearing upon the hub; and Fig. 5 is a view of the completed hub, the flanges having been set in position on the hub and locked there.

1 denotes a tube, which constitutes the box of the hub. This tube is provided near each end with a shoulder or projection 2, which may be formed in any suitable manner. At each end of the tube is placed a flange 3, the edge of which is turned outward and then curved inward, so as to form a receptacle 4 to receive and hold any oil that may escape from the tube or box when the wheel is in use, thus preventing the oil from running down the spokes and soiling clothing that may come in contact therewith. These flanges are formed from disks of metal A, (see Fig. 1,) said disks being provided with a central hole 5 to receive the tube or box and a series of spoke-holes 6, said central hole and spoke-holes being punched out simultaneously with the blanking out of the disk. The next operation is to draw or cup the disk to substantially the form illustrated in Fig. 2. The third operation is to curve the edge of the cup substantially as shown in Fig. 3, so as to form a receptacle 4 within the flange, which catches and holds the oil which runs out from the tube or box. In Fig. 4 I have shown the flange as provided with a neck 7, which gives greater bearing-surface on the tube. This neck, when used, is formed at the same operation that curves in the edge of the flange and forms the oil-receptacle.

The assembling is performed by placing the flanges over the ends of the tubes, the spoke-holes being preferably interspaced, and pressing them down until the flanges or necks rest against the shoulders or projections 2. The ends of the tube are then expanded outward, so as to lock the flanges securely in place.

Having thus described my invention, I claim—

1. A hub for wire wheels, consisting of a tube having shoulders near its ends and flanges outside of and resting against said shoulders and secured in place thereon, said flanges being curved outward and then inward to form receptacles to receive and retain the oil that runs out from the tube in use.

2. A hub for wire wheels, consisting of a tube having shoulders near its ends and flanges having necks which rest against the outer side of said shoulders and are secured in place thereon, said flanges being curved outward and then inward to form oil-receptacles, substantially as described.

3. The method of making hubs for wire wheels, which consists in forming tubes with shoulders near their outer ends, forming disks having central holes to receive the tube and spoke-holes, then drawing said disks to cup shape, then closing the edges of the partly-formed flanges inward to form oil-receptacles, then placing the disks over the ends of the tubes and against the shoulders, and then securing the disks in place, substantially as described.

4. The method of making hubs for wire wheels, which consists in forming tubes having shoulders near their outer ends, forming disks with central holes to receive the tube and spoke-holes, then drawing the disks to cup shape, then closing in the edges of the partly-formed flanges to form oil-receptacles and simultaneously forming necks surrounding the central opening, then placing the flanges upon the ends of the tubes, with the necks resting against the shoulders, the spoke-holes being interspaced, and finally expanding the ends of the tubes to lock the flanges in place.

In testimony whereof I affix my signature in presence of two witnesses.

FRANK A. WILMOT.

Witnesses:
A. M. WOOSTER,
NELLIE A. FRAWLEY.